(12) United States Patent
Butts et al.

(10) Patent No.: US 12,401,787 B2
(45) Date of Patent: Aug. 26, 2025

(54) METHOD AND APPARATUS FOR ENCODING OR DECODING INTERLACED BLOCKS OF VIDEO

(71) Applicant: Comcast Cable Communications, LLC, Philadelphia, PA (US)

(72) Inventors: Robert O. Butts, Denver, CO (US); Chris David Lemmons, Denver, CO (US); Jonathan Gray, Lakewood, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/248,575

(22) Filed: Jan. 29, 2021

(65) Prior Publication Data
US 2022/0248005 A1    Aug. 4, 2022

(51) Int. Cl.
| H04N 7/12 | (2006.01) |
| H04N 7/01 | (2006.01) |
| H04N 19/112 | (2014.01) |
| H04N 19/156 | (2014.01) |
| H04N 19/61 | (2014.01) |
| H04N 21/24 | (2011.01) |
| H04N 21/845 | (2011.01) |

(52) U.S. Cl.
CPC ......... *H04N 19/112* (2014.11); *H04N 7/0102* (2013.01); *H04N 7/0135* (2013.01); *H04N 19/156* (2014.11); *H04N 19/61* (2014.11); *H04N 21/2402* (2013.01); *H04N 21/8456* (2013.01)

(58) Field of Classification Search
CPC .................................................. H04N 21/8456
See application file for complete search history.

(56) References Cited

PUBLICATIONS

Francois E et al., "Interlaced coding in SVC", 21. JVT Meeting; 78. MPEG Meeting; (Joint Video Team of ISO/IEC JTC1/SC29/WG11 and ITU-T SG.16 ),, No. JVT-U146, Oct. 20, 2006 (Oct. 20, 2006), XP030006792, 18 Pages.

*Primary Examiner* — Young Lee
(74) *Attorney, Agent, or Firm* — BakerHostetler

(57) ABSTRACT

Systems and methods are described for processing video content. Content may be encoded/transcoded for delivery to a computing device that requested the content. The content may be encoded as temporally interlaced blocks, which interlaces frames over time. Because the frames are temporally interlaced, the computing device may be able to decode and play back a full-length or complete video at a reduced quality even if every temporally interlaced block was not received by the computing device, such as when network bandwidth is low or the network connection is disrupted. Receiving only a portion of the temporally interlaced blocks may be still be sufficient to display a full-length video at a reduced quality (e.g., at a reduced bit rate).

20 Claims, 12 Drawing Sheets

METHOD AND APPARATUS FOR ENCODING OR DECODING INTERLACED BLOCKS OF VIDEO

BACKGROUND

A user device requesting a transcoded video may request a video encoded at a particular bit rate, but the user device may have very little knowledge of its network's capacity. If a user device selects a video fragment with a bit rate that is too high for their network, the video playback experience may be poor. More efficient video processing methods are desired.

SUMMARY

Systems and methods are described for processing video content. Content may be encoded/transcoded for delivery to a computing device that requested content. The content may be encoded as temporally interlaced blocks, which interlaces frames in the content with respect to time. Because the frames are temporally interlaced, receiving only a portion of the temporally interlaced blocks is still sufficient to play back a full-length video at a reduced quality (e.g., at a reduced bit rate or lower resolution). The CDN or computing device may also dynamically select the video bit rate by terminating the network connection. For example, if network conditions are poor, the CDN or computing device may terminate the network connection causing the computing device to decode the partially received temporally interlaced blocks and play back the reduced quality version of the video content.

BRIEF DESCRIPTION OF THE DRAWINGS

The following drawings show generally, by way of example, but not by way of limitation, various examples discussed in the present disclosure. In the drawings.

DETAILED DESCRIPTION OF ILLUSTRATIVE EMBODIMENTS

Systems and methods are described for processing content. Content may be encoded/transcoded for delivery via a network (e.g., the content origin, CDN, or other intermediary service) to a playback device such as a computing device. The computing device may decode and/or display the content. The terms transcode and encode may be used interchangeably herein. The techniques for video processing described herein may be applicable to any delivery method including but not limited to Dynamic Adaptive Streaming over Hypertext Transfer Protocol (HTTP) (DASH), HTTP Live Streaming (HLS), the QAM digital television standard, and ABR streaming.

Figure 1:
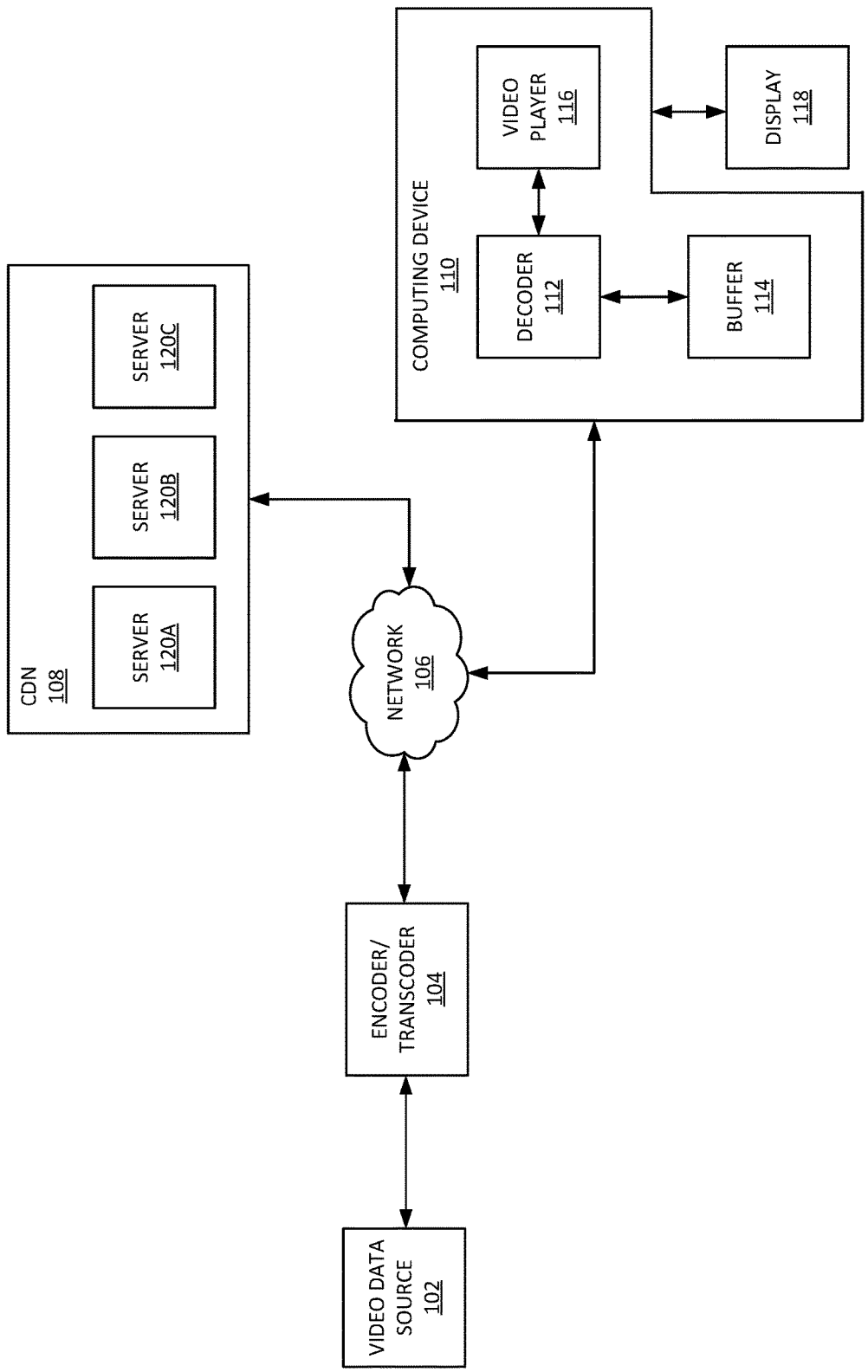
FIG. 1 shows an example system.

FIG. 1 shows system 100 configured for video processing. The system 100 may comprise a video data source 102, an encoder/transcoder 104, a CDN 108, and a computing device 110. The CDN 108 may comprise a CDN or other intermediary service. The video data source 102, the encoder/transcoder 104, the CDN 108, the computing device 110, and/or any other component of the system 100 may be interconnected via a network 106. The network 106 may comprise a wired network, a wireless network, or any combination thereof. The network 106 may comprise a public network, such as the Internet. The network 106 may comprise a private network, such as a content provider's distribution system. The network 106 may communicate using technologies such as WLAN technology based on the Institute of Electrical and Electronics Engineers (IEEE) 802.11 standard, wireless cellular technology, Bluetooth, coaxial cable, Ethernet, fiber optics, microwave, satellite, Public Switched Telephone Network (PTSN), Digital Subscriber Line (DSL), BPL, or any other appropriate technologies.

The computing device 110 may comprise a user device, a client device, a television, a monitor, a laptop, a desktop, a smart phone, a set-top box, a cable modem, a gateway, a tablet, a wearable computing device, a mobile computing device, any computing device configured to receive and/or playback video, the like, and/or any combination of the foregoing. The computing device 110 may comprise a decoder 112, a buffer 114, and a video player 116. The computing device 110 (e.g., the video player 116) may be communicatively connected to a display 118. The display 118 may be a separate and discrete component from the computing device 110, such as a television display connected to a set-top box. The display 118 may be integrated with the computing device 110. The decoder 112, the video player 116, the buffer 114, and the display 118 may be realized in a single device, such as a laptop or mobile device. The decoder 112 may decompress/decode encoded video content. The encoded video content may be received from the encoder/transcoder 104 or the CDN 108.

The CDN 108 may comprise one or more computing devices such as servers 120A, 120B, 120C. The one or more servers 120A, 120B, 120C of the CDN 108 may be configured to act as intermediary servers located between the computing device 110 and the video data source 102. The one or more servers 120A, 120B, 120C of the CDN 108 may serve cached content to the computing device 110. The cached content may comprise video content such as one or more video fragments. The CDN 108 may receive a request for content from the computing device 110. The CDN 108 may authorize/authenticate the request and/or the computing device 110 from which the request originated. The request for content may comprise a request for video content, a channel, a video on-demand asset, a website address, a video asset associated with a streaming service, the like, and/or any combination of the foregoing. The CDN 108 may send the request to the video data source 102.

The video data source 102 may comprise a broadcast source, a headend, a server (e.g., a server streaming video or a video on-demand server), a cable modem termination system, the like, and/or any combination of the foregoing. The video data source 102 may send uncompressed, raw video data comprising a sequence of frames. The frames may comprise pixels. A pixel may comprise a smallest controllable element of a frame. A frame may comprise bits for controlling each associated pixel. A portion of the bits for an associated pixel may control a luma value (e.g., light intensity) of each associated pixel. A portion of the bits for an associated pixel may control one or more chrominance value (e.g., color) of the pixel.

The video data source 102 may receive requests for content (e.g., video data) from the encoder/transcoder 104, the computing device 110, or the CDN 108. The video data source 102 may send uncompressed video data to the encoder/transcoder 104 based on a request for content from the encoder/transcoder 104, the computing device 110, or the CDN 108. The video data source 102, the encoder/transcoder 104, and the CDN 108 may also be co-located at a premises in multiple devices or a single device, located at separate premises, or associated with separate instances in the cloud.

The encoder/transcoder 104 may encode/transcode the content received from the video data source 102. The encoder/transcoder 104 may receive uncompressed video data (e.g., plurality of frames) from the video data source 102 (either through the same channel/format or via different channels). The encoder/transcoder 104 may encode (e.g., compress) the uncompressed video data to generate encoded content. The encoder/transcoder 104 may comprise a codec comprising an encoder and decoder. The codecs described herein may be based on standards including but not limited to H.265/MPEG—High Efficiency Video Coding (HEVC), H.264/MPEG—Advanced Video Coding (AVC), or Versatile Video Coding (VVC).

Transcoding video may result in video fragments encoded at numerous bit rates. Computing devices may request a video fragment at a bit rate based on the performance of their network. For example, computing devices communicating via networks with higher available bandwidth may request higher quality video fragments (e.g., video fragments transcoded at higher bit rates). If a video fragment is selected with a bit rate that is too high for their network, the video playback experience may be poor. For example, the time-to-first-frame may be undesirably long. Further, because these video fragments are temporally linear, if a video fragment download fails, the same video fragment must be requested again, or playback of the video content may be disrupted or incomplete.

The system 100 may be configured to process content encoded in a plurality of temporally interlaced blocks. Spatial interlacing involves interlacing an image such that the entire image can be displayed at various levels of quality as the image file is received. For example, spatial interlacing allows web browsers to display a fuzzy-but-complete image when the image is only partially downloaded and to display a progressively clearer image as the full file is completely downloaded. Temporally interlacing video comprises spatially interlacing each frame of the video with respect to time. Video file formats typically include the entire first frame, followed by the entire second frame, and so on. A temporally interlaced video file may comprise a portion of each of one or more frames. For example, a temporally interlaced video file may comprise a portion of the first frame, followed by a portion of the second frame, and so on. For example, a temporally interlaced video file may comprise one byte of the first frame, followed by one byte of the second frame, and so on.

Encoding video into temporally interlaced blocks may enable dynamic selection of a video bit rate. For example, encoding video into temporally interlaced blocks may enable the content origin such as the video data source 102, the CDN 108 (or other intermediary service), or the computing device 110 to select a video bit rate dynamically. For example, the bit rate may be determined dynamically by displaying a portion of a video file causing a reduced quality version of the video to be displayed. The bit rate may be selected dynamically based on network conditions. Additionally, if a connection between the CDN 108 and the computing device 110 is terminated before a full-length video is delivered, the computing device 110 may still view a reduced quality version of the full-length video if the frames have been temporally interlaced based on the techniques disclosed herein.

The encoder/transcoder 104 may encode the content into a plurality of blocks. The plurality of blocks may be temporally interlaced. Each block of the plurality of blocks may comprise a portion of a frame of the plurality of frames. The portion may comprise a plurality of bytes of the frame. The encoder/transcoder 104 may send the encoded content to the requesting component, such as the CDN 108 or the computing device 110. The decoder may receive the compressed video and decode the video (e.g., into a decompressed format). Because the blocks are temporally interlaced, the computing device 110 may receive portions of each frame in a video before receiving further portions of the same frame. As a result, once the computing device 110 receives a number of blocks matching the total number of frames in the video, the computing device 110 has enough video data to decode/display a complete image/fragment of the video, at least at a reduced quality.

Figure 2:
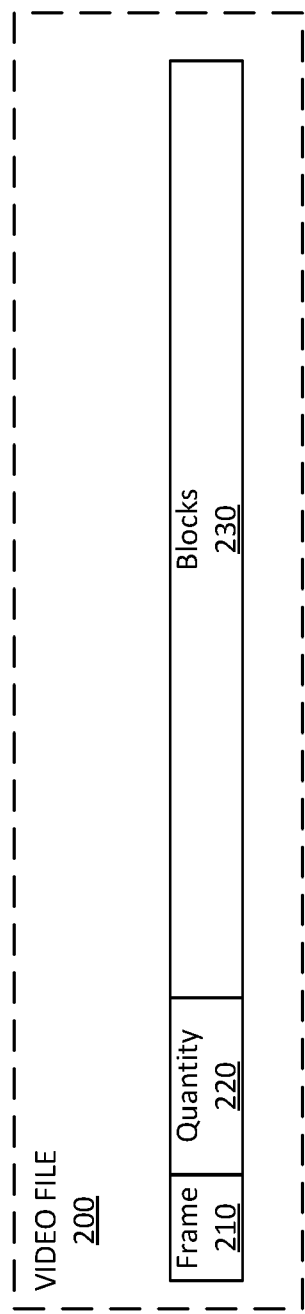
FIG. 2 shows an example video file format.

FIG. 2 shows an example video file format 200 for video content encoded as a plurality of temporally interlaced blocks. The video file format may comprise one or more of the following: information indicating a time to display each frame 210, information indicating a quantity of frames in the video 220, and the encoded plurality of temporally interlaced blocks 230. The quantity of frames in the video 220 may be encoded, to indicate to a playback computing device where a second block for the first frame begins. For example, if each block is 5 bytes, and there are 10 frames in the video, then the first block for the first frame comprises bytes 1-5 and the second block of the first frame comprises bytes 51-55, and so on.

Figure 3:
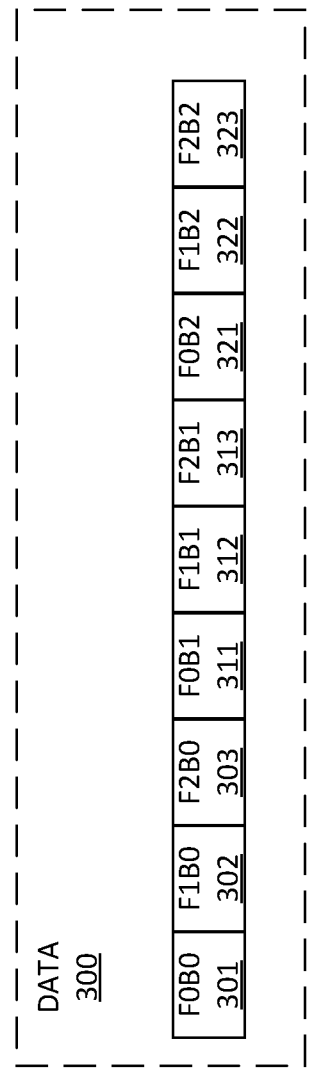
FIG. 3 shows an example data file format.

FIG. 3 shows an example data format 300 for video content encoded as a plurality of temporally interlaced blocks. Each temporally interlaced block, of the plurality of temporally interlaced blocks, may comprise a portion of one of the three frames of the video content. For example, each temporally interlaced block may comprise a portion of the bytes in a frame. For example, FIG. 3 shows a plurality of blocks and each block comprises a portion of one of the three frames: a first block for the first frame (frame 0, block 0 301), a first block for the second frame (frame 1, block 0 302), a first block for the third frame (frame 2, block 0 303), a second block for the first frame (frame 0, block 1 311), a second block for the second frame (frame 1, block 1 312), a second block for the third frame (frame 2, block 1 313), a third block for the first frame (frame 0, block 2 321), a third block for the second frame (frame 1, block 2 322), and a third block for the third frame (frame 2, block 2 323).

Figure 4:
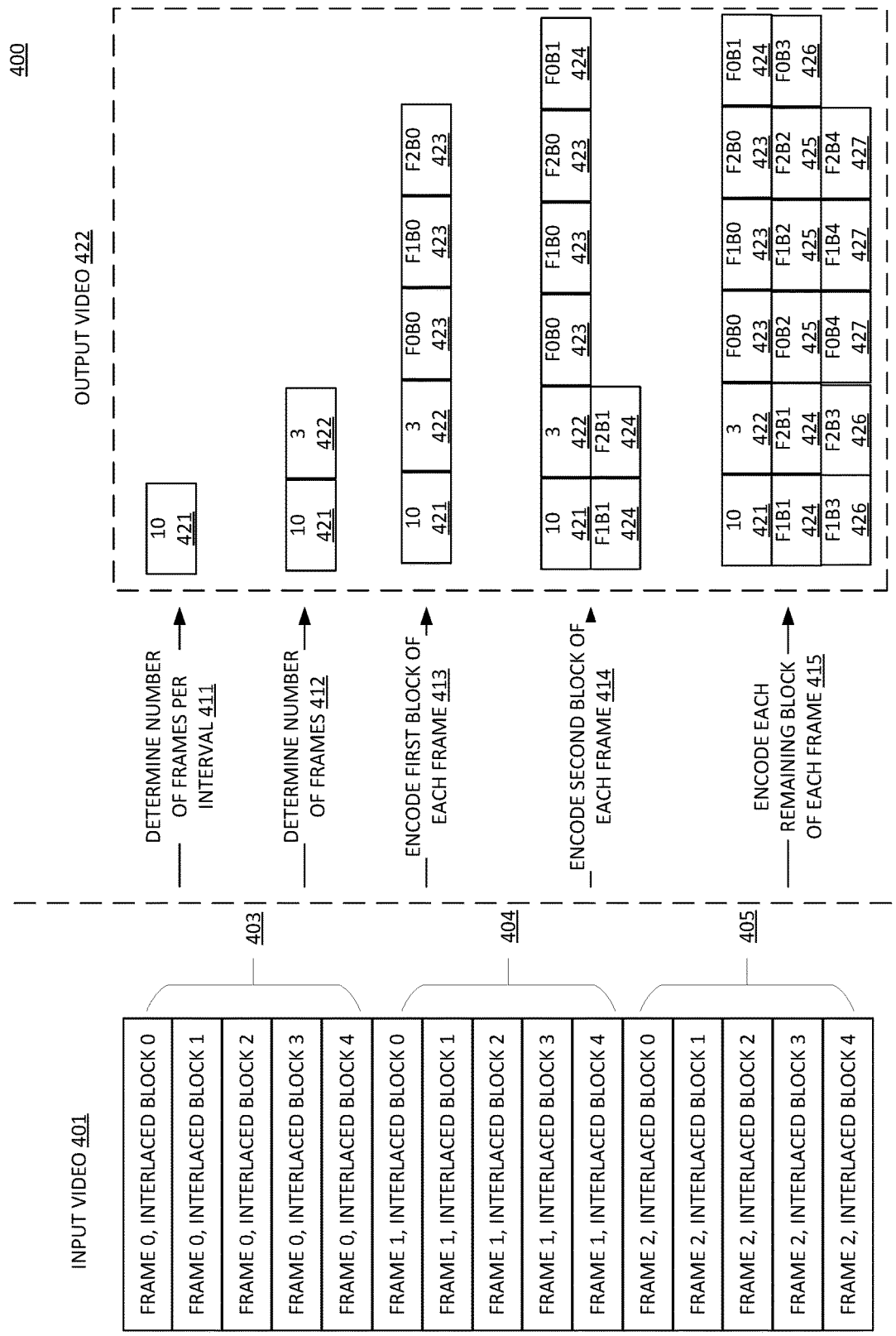
FIG. 4 shows an example method.

FIG. 4 shows an example method 400 for encoding. FIG. 4 shows the input video 401 and the output video 402. The input video may comprise frame 0 comprising blocks 0-4 403, frame 1 comprising blocks 0-4 404, and frame 2 comprising blocks 0-4 405. At step 411, an encoding device (e.g., a computing device comprising a codec or an encoder) may determine the number of frames per time interval and any other metadata. The determination may indicate the milliseconds per frame and the other metadata. The determining may be based on a request for content from a computing device. The request may be received by a content origin, CDN, or other intermediary service. The frames per time interval may indicate that there are 10 frames per time interval 421. The metadata may comprise other format information associated with the video content. At step 412, the encoding device may determine the number of frames in the video. The number of frames in the video may comprise 3 frames 422.

At step 413, the encoding device may encode the first block for each frame. A first plurality of temporally interlaced blocks 423 may comprise frame 0, block 0; frame 1, block 0; and frame 2, block 0. The first plurality of temporally interlaced blocks 423 may comprise a first portion of each frame of the input video 401.

At step 414, the encoding device may encode a second plurality of temporally interlaced blocks 424. The second block for each frame 424 may comprise frame 0, block 1; frame 1, block 1; and frame 2, block 1. The second plurality of temporally interlaced blocks 424 may comprise a second portion of each frame of the input video 401.

At step 415, the encoding device may continue encoding blocks for the remaining portions of the frames to complete encoding of the output video 402. The remaining blocks may comprise the third block of each frame 425 comprising frame 0, block 2; frame 1, block 2; and frame 2, block 2. The remaining blocks may comprise the fourth block of each frame 426 comprising frame 0, block 3; frame 1, block 3; and frame 2, block 3. The remaining blocks may comprise the fifth block of each frame 427 comprising frame 0, block 4; frame 1, block 4; and frame 2, block 4.

Figure 5:
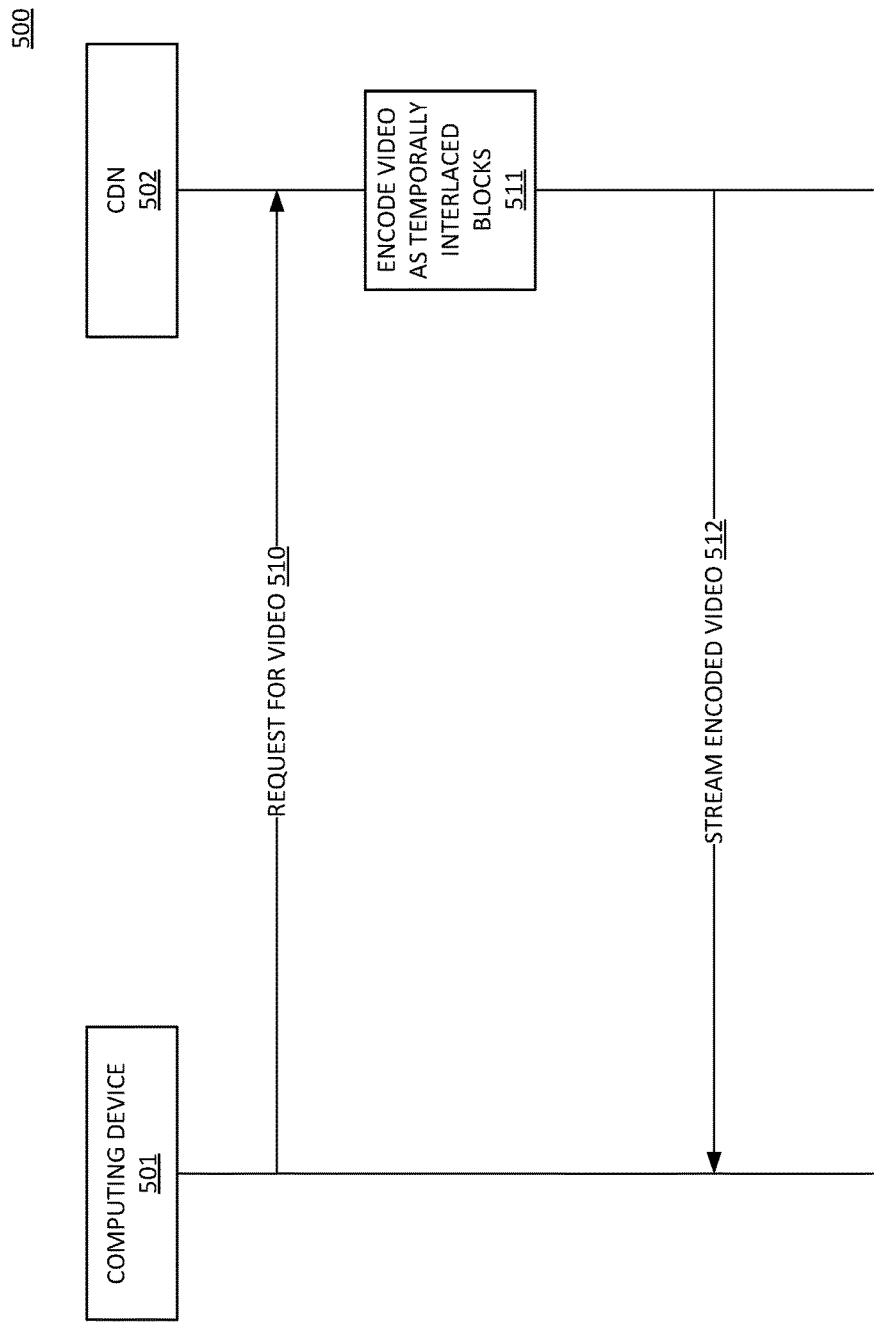
FIG. 5 shows an example method.

FIG. 5 shows an example method 500. While each step in the method 500 of FIG. 5 is shown and described separately, multiple steps may be executed in a different order than what is shown, in parallel with each other, concurrently with each other, or serially with each other. The example method 500 depicts streaming video from a CDN 502 to a computing device 501 with a high bandwidth connection. At step 510, a request for video content may be received by the CDN 502 and from the computing device 501. The computing device 501 may comprise any device comprising a codec/decoder. The video content may comprise a plurality of video fragments. The video content may comprise a 12 MB, 2-second video fragment. The CDN 502 may comprise a CDN or other intermediary service.

At step 511, the CDN 502 may encode the video fragment as a plurality of temporally interlaced blocks. Each temporally interlaced block, of the temporally interlaced plurality of blocks, may comprise a portion of a frame of the video content. For example, each temporally interlaced block may comprise a portion of the bytes in a frame. For example, the CDN 502 may encode a first block for a first frame, a first block for a second frame, and a first block for every subsequent frame in the video content. Once every first block for every frame is encoded, the CDN 502 may encode a second block for the first frame, a second block for the second frame, and a second block for every subsequent frame in the video content. The CDN 502 may continue encoding blocks for each remaining portion of each frame.

At step 512, the CDN 502 may stream the encoded 12 MB video fragment to the computing device 501. The CDN 502 may have a stable connection with the computing device 501 enabling the CDN 502 to stream the full video fragment to the computing device 501 in 1 second. This may cause the computing device 501 to successfully receive the highest video bit rate in sufficient time to play back the full video.

Figure 6:
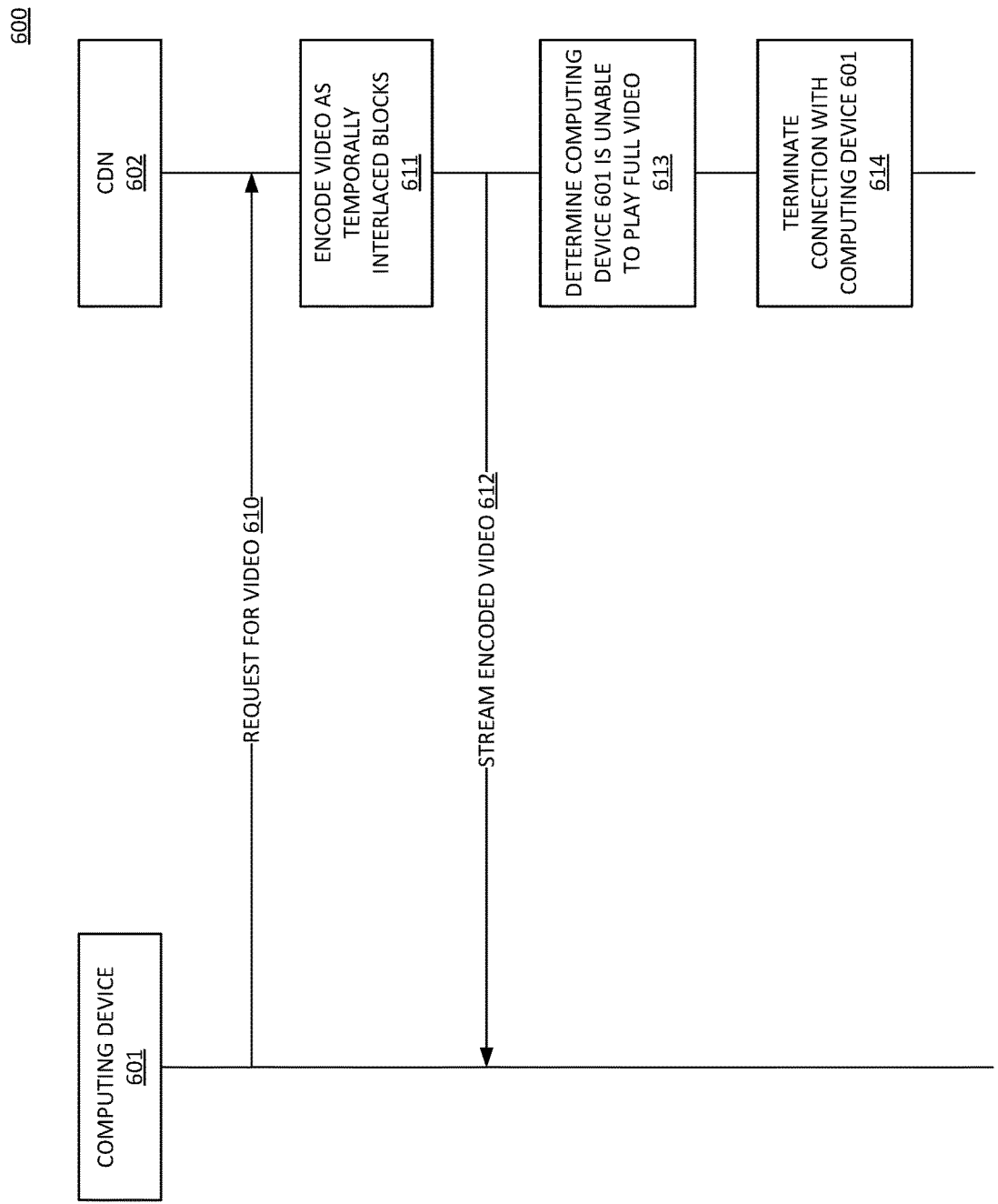
FIG. 6 shows an example method.

FIG. 6 shows an example method 600. While each step in the method 600 of FIG. 6 is shown and described separately, multiple steps may be executed in a different order than what is shown, in parallel with each other, concurrently with each other, or serially with each other. The example method 600 depicts streaming video from a CDN 602 to a computing device 601 that may have a network connection with insufficient bandwidth for playback of a high bit rate video. At step 610, a request for video content may be received by the CDN 602 and from the computing device 601. The computing device 601 may comprise any device comprising a codec/decoder. The video content may comprise a plurality of video fragments. The video content may comprise a 12 MB, 2-second video fragment. The CDN 602 may comprise a CDN or other intermediary service.

At step 611, the CDN may encode the video fragment as a plurality of temporally interlaced blocks. Each temporally interlaced block, of the temporally interlaced plurality of blocks, may comprise a portion of a frame of the video content. For example, each temporally interlaced block may comprise a portion of the bytes in a frame. For example, the CDN 602 may encode a first block for a first frame, a first block for a second frame, and a first block for every subsequent frame in the video content. Once every first block for every frame is encoded, the CDN 602 may encode a second block for the first frame, a second block for the second frame, and a second block for every subsequent frame in the video content. The CDN 602 may continue encoding blocks for each remaining portion of each frame.

At step 612, the CDN 602 may stream the encoded 12 MB video fragment to the computing device 601. The CDN 602 may have a poor connection with the computing device 601 enabling the CDN 602 to only stream 6 MB of the 12 MB video fragment to the computing device 601 in 1.9 seconds. This performance may cause the computing device 601 to have insufficient time to play back the full video. This poor performance may be based on low bandwidth available in the network.

At step 613, the CDN 602 may determine that the computing device 601 will be unable to playback the full 2-second video fragment because it will take longer than 2 seconds to stream the full video to the computing device 601. At step 614, the CDN 602 may terminate the connection with the computing device 601. Terminating the connection may terminate streaming of video fragment. Because the video fragment was encoded as a plurality of temporally interlaced blocks, terminating the connection may cause playback, by the computing device 601, of the video fragment at the highest possible bit rate for the computing device 601. For example, decoding each first block of every frame causes the video fragment to be played back at a reduced quality (e.g., at a low quality bit rate or resolution). By decoding each subsequent block of every frame that was received prior to the connection termination, the video fragment may be played back at increasingly improved quality until the computing device 601 reaches the highest bit rate that it is capable of playing back. For example, the video fragment may be played back at a lower quality (e.g., a low quality bit rate or resolution) than the original 12 MB video fragment.

Figure 7:
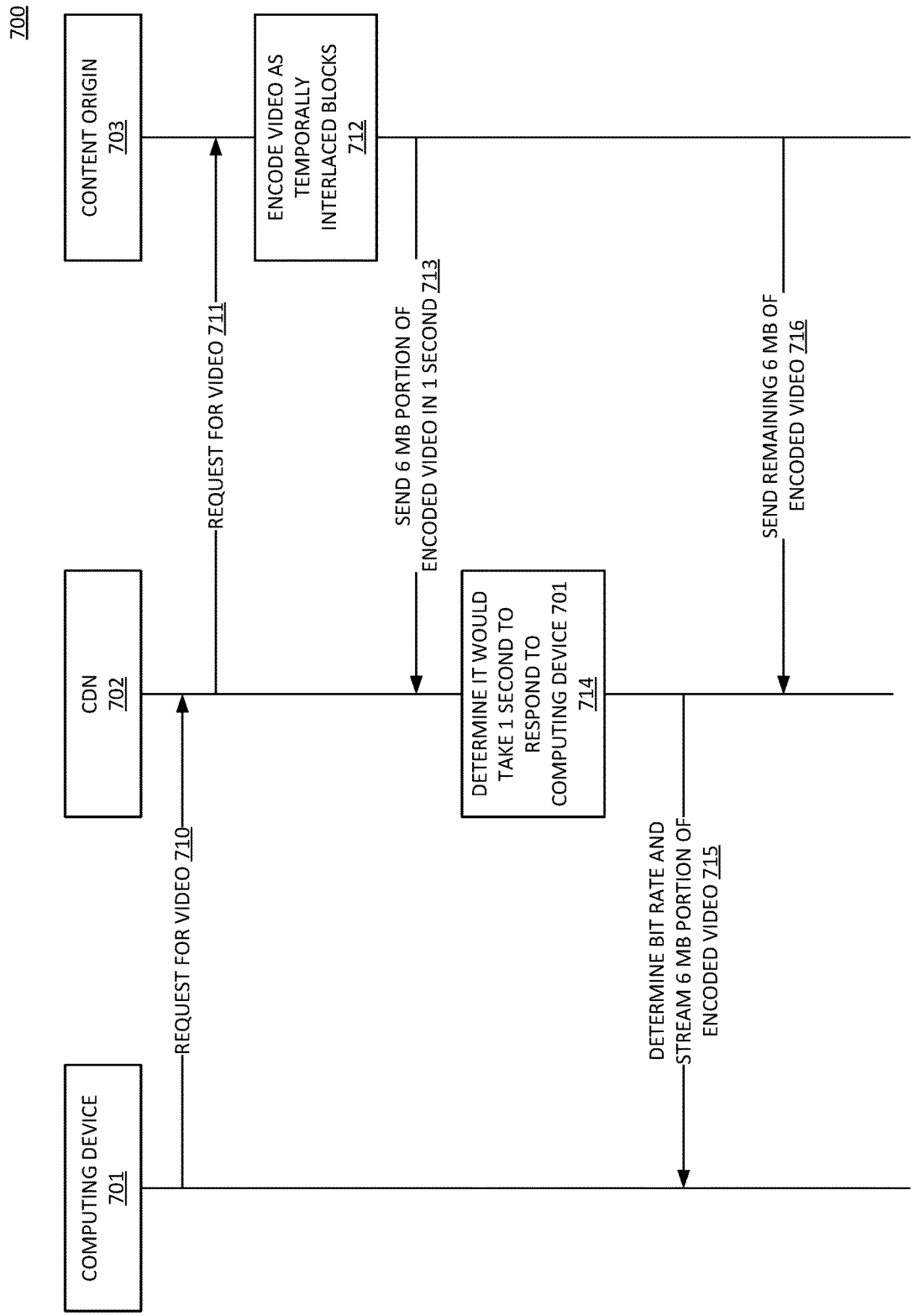
FIG. 7 shows an example method.

FIG. 7 shows an example method 700. While each step in the method 700 of FIG. 7 is shown and described separately, multiple steps may be executed in a different order than what is shown, in parallel with each other, concurrently with each other, or serially with each other. The example method 700 depicts streaming video from a CDN 702 to a computing device 701 that may have a network connection with insufficient bandwidth for reception of a high bit rate video from the content origin 703. At step 710, a request for video content may be received by the CDN 702 and from the computing device 701. The computing device 701 may comprise any device comprising a codec/decoder. The video content may comprise a plurality of video fragments. The video content may comprise a 12 MB, 2-second video fragment. The CDN 702 may comprise a CDN or other intermediary service.

At step 711, the CDN 702 may request the video fragment from the content origin 703. At step 712, the content origin 703 may encode the video fragment as a plurality of temporally interlaced blocks. Each temporally interlaced block, of the temporally interlaced plurality of blocks, may comprise a portion of a frame of the video content. For example, each temporally interlaced block may comprise a portion of the bytes in a frame. For example, the content origin 703 may encode a first block for a first frame, a first block for a second frame, and a first block for every subsequent frame in the video content. Once every first block of every frame is encoded, the content origin 703 may encode a second block for the first frame, a second block for the second frame, and a second block for every subsequent frame in the video content. The content origin 703 may continue encoding blocks for each remaining portion of each frame.

At step 713, the content origin 703 may send, in one second, only 6 MB of the 12 MB, 2-second video fragment. This performance may cause the computing device 701 to have insufficient time to play back the full video. This poor performance may be based on low bandwidth available in the network. At step 714, the CDN 702 may determine that it would take at least one second to respond to the computing device 701. At step 715, the CDN 702 may stream the 6 MB of the video fragment providing the computing device 702 with a dynamically determined bit rate. The bit rate is dynamically determined because the video fragment was encoded as a plurality of temporally interlaced blocks causing the computing device 701 to play back the full video fragment even though only 6 MB of the 12 MB video was delivered. For example, decoding each first block of every frame causes the video fragment to be played back at a reduced quality (e.g., at a low quality bit rate or resolution). By decoding each subsequent block of every frame of the 6 MB video fragment, the video is played back at increasingly improved quality until the computing device 701 decodes the 6 MB video fragment. At step 716, the content origin 703 may stream, to the CDN 702, the remaining 6 MB of the video content. A maximum bit rate version of the video may then be stored in the CDN 702 (e.g., in a cache). The CDN 702 may then provide the full 12 MB video to other computing devices in response to future requests.

Figure 8:
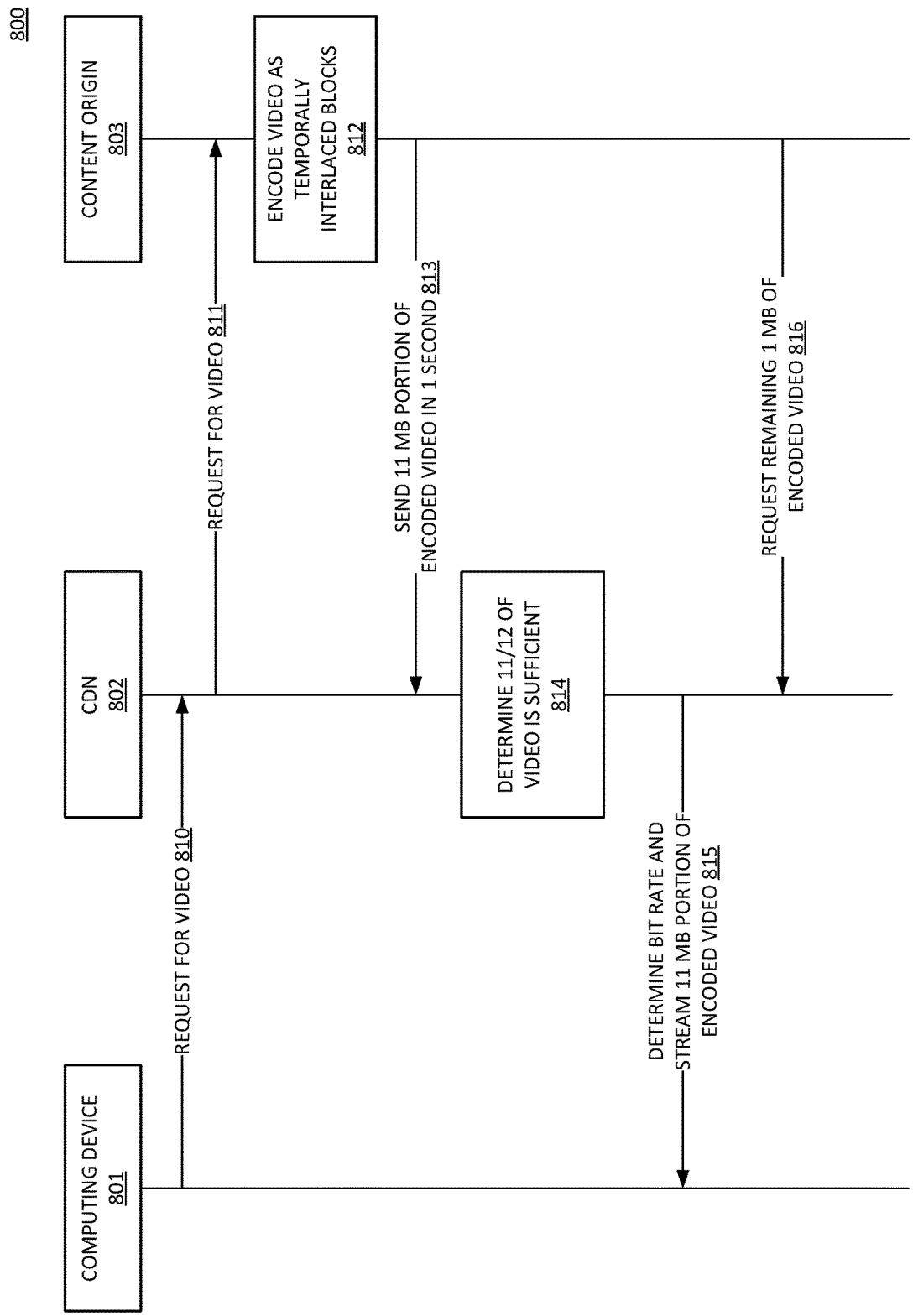
FIG. 8 shows an example method.

FIG. 8 shows an example method 800. While each step in the method 800 of FIG. 8 is shown and described separately, multiple steps may be executed in a different order than what is shown, in parallel with each other, concurrently with each other, or serially with each other. The example method 800 depicts streaming video from a CDN 802 to a computing device 801 that may have received only a portion of the video from the content origin 803. At step 810, a request for video content may be received by the CDN 802 and from the computing device 801. The computing device 801 may comprise any device comprising a codec/decoder. The video content may comprise a plurality of video fragments. The video content may comprise a 12 MB, 2-second video fragment. The CDN 802 may comprise a CDN or other intermediary service.

At step 811, the CDN 802 may request the video fragment from the content origin 803. At step 812, the content origin 803 may encode the video fragment as a plurality of temporally interlaced blocks. Each temporally interlaced block, of the temporally interlaced plurality of blocks, may comprise a portion of a frame of the video content. For example, each temporally interlaced block may comprise a portion of the bytes in a frame. For example, the content origin 803 may encode a first block for a first frame, a first block for a second frame, and a first block for every subsequent frame in the video content. Once every first block of every frame is encoded, the content origin 803 may encode a second block for the first frame, a second block for the second frame, and a second block for every subsequent frame in the video content. The content origin 803 may continue encoding blocks for each remaining portion of each frame.

At step 813, the content origin 803 may send, in one second, 11 MB of the 12 MB, 2-second video fragment, and then the connection between the content origin 803 and CDN 802 may fail. At step 814, the CDN 802 may determine that $11/12$ of the video is sufficient to send to the computing device 801. For example, this determination may be made heuristically. At step 815, the CDN 802 may stream the 11 MB of the video fragment providing the computing device 802 with a dynamically determined bit rate that is at a slightly reduced quality. The bit rate is dynamically determined because the video fragment was encoded as a plurality of temporally interlaced blocks causing the computing device 801 to play back the full video fragment even though a slightly reduced quality version of the video was provided (11 MB of the 12 MB). For example, decoding each first block of every frame causes the video fragment to be played back at a reduced quality (e.g., at a low quality bit rate or resolution). By decoding each subsequent block of every frame of the 11 MB video fragment, the video is played back at increasingly improved quality until the computing device 801 decodes the 11 MB video fragment. At step 816, the CDN 802 may send a request for the remaining bytes of the video. The request may, for example, comprise a range request or other partial data request mechanism. A maximum bit rate version of the video may then be stored in the CDN 802 (e.g., in a cache). The CDN 802 may then provide the full 12 MB video to other computing devices in response to future requests.

Figure 9:
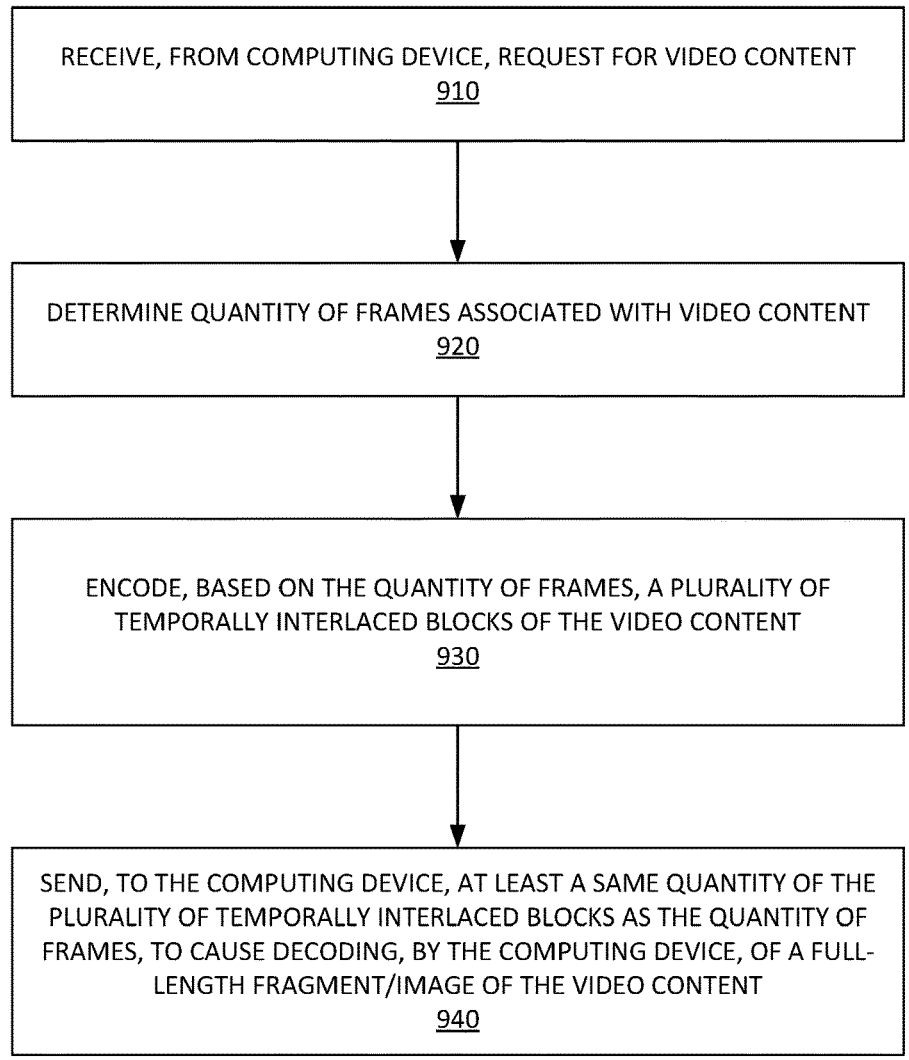
FIG. 9 shows an example method.

FIG. 9 shows an example method 900. The method 900 of FIG. 9, may be performed by any device, for example, by any of the devices depicted in FIGS. 1-8 or described herein. While each step in the method 900 of FIG. 9 is shown and described separately, multiple steps may be executed in a different order than what is shown, in parallel with each other, concurrently with each other, or serially with each other. At step 910, a request for video content may be received from a computing device. For example, a CDN may receive a request for video content from a computing device. The CDN may send the request to a content origin. The video content may comprise at least one of: one or more video fragments; one or more video segments; or streamed video content such as a program, show, or movie. At step 920, a quantity of frames, associated with the video content, may be determined. For example, the CDN or the content origin may determine the quantity of frames associated with the video content. The quantity of frames may represent a time interval within a video or the full length of the video.

At step 930, based on the quantity of frames, a plurality of temporally interlaced blocks of the video content may be encoded. Each temporally interlaced block, of the temporally interlaced plurality of blocks, may comprise a portion of a frame of the video content. Each temporally interlaced block may comprise a portion of the bytes in a frame. The plurality of temporally interlaced blocks may comprise a sequence of each portion of each frame of video content. For example, the CDN or the content origin may encode a first block of a first frame, a first block of a second frame, and a first block of every subsequent frame in the video content. Once every first block of every frame is encoded, the CDN or content origin may encode a second block of the first frame, a second block of a second frame, and a second block of every subsequent frame in the video content. The CDN or content origin may continue encoding blocks for each remaining portion of each frame.

As a result of the frames of video content having been encoded as a plurality of temporally interlaced blocks, the bit rate of the video content may be determined dynamically. For example, the CDN or the content origin encoding the video the video may select the bit rate of the video content. The CDN or the content origin may use a determination of the computing device's bandwidth and/or latency, factored with the quantity of frames (e.g., the length of the video content or video fragment length), to determine the bit rate. Alternatively, the CDN or the content origin may use a hard-coded or configurable bit rate when encoding video, which may be less than the true maximum bit rate or file size that is being encoded. To select a bit rate lower than the maximum, the CDN may terminate the connection to the computing device as though the complete file had been sent, which causes the computing device to display the blocks received prior to the termination. If the quantity of blocks is as least as much as the determined quantity of frames, a full-length fragment of the video content is able to be displayed, at least at a low quality (e.g., low quality bit rate or resolution). This allows the CDN to serve a partially successful result, which represents the complete video fragment length at a reduced quality (e.g., at a low quality bit rate or resolution), but without temporal interlacing, the CDN cannot send the complete video length.

With traditional non-interlaced video using variant manifests for bit rates, a CDN or the content origin cannot choose a bit rate, and it serves whichever files the computing device requests. The techniques disclosed herein enable a CDN or the content origin to select a bit rate. This results in reduced computational cost because the CDN or the content origin encodes the video content with a single transcoding/encoding instead encoding more than one variant. This feature allows the CDN or the content origin to select a bit rate and effectively transcode on the fly with zero computational cost. The CDN may store only one copy of each video to cache. With streaming video technologies (e.g., technologies based on fragments and manifests, such as HLS or DASH), the CDN caches multiple variant manifests for every bit rate, as well as fragments of the same video at every encoded bit rate. With temporal interlacing, variants become unnecessary, and so the CDN may cache only a single copy of the video, reducing not only storage costs, but also reducing origin requests, internal CDN tier traffic, and computing device requests. Reduced storage costs on a CDN also result in increased cache efficiency.

For example, a content origin may provide an 4K resolution video. Instead of transcoding the full 4K resolution video, the content origin may determine that it may only serve a 1080p resolution at the time. This determination may be based on network conditions at that time. The content origin may encode a single 4K video at its highest resolution, and send a 1080p video to the CDN and to computing devices for playback, simply by encoding the video content as a plurality of temporally interlaced blocks and truncating and only sending ¼ of the file.

At step 940, at least a same quantity of the plurality of temporally interlaced blocks as the quantity of frames, may be sent, to the computing device. This may cause decoding/ display, by the computing device, of a full-length fragment of the video content. For example, decoding each first block of every frame causes a full-length fragment of the video content to be displayed at a reduced quality (e.g., low quality bit rate or resolution). By decoding each subsequent block of every frame, the full-length fragment of the video content is displayed at increasingly improved quality. For example, a computing device may receive each first block of every frame from a CDN, and the connection to the CDN may terminate. The computing device may decode each first block of every frame causing display of a full-length fragment of the video content to be displayed at a low quality (e.g., low quality bit rate or resolution). The CDN or the computing device may reestablish the connection so that the remaining blocks of the plurality of blocks are sent.

This technique may enable the computing device to select a bit rate for the video content. The bit rate selection may be based on the computing device's connection determination. The computing device may select the bit rate by, for example, terminating the connection after a given number of bytes are received or by sending an HTTP Range Request or other partial data request mechanism. With traditional non-temporally-interlaced video technologies which use variant manifests for variable bit rate, the computing device may select the bit rate, but this may require a new HTTP and potentially new TCP connection. With traditional non-temporally-interlaced video technologies, the computing device also needs to know the desired bit rate before the request is initiated, and it may require the computing device to request multiple bit rates in order to quickly downshift variants.

For example, in poor network conditions, the computing device may playback a same quantity of the encoded plurality of temporally interlaced blocks as the quantity of frames to allow the computing device to watch an uninterrupted video (at a reduced quality), where an intermittent network would otherwise make a traditional video fragment result in black screens for the missing period of time. The computing device may also shift quality of video without a new request, by continuing to receive a file as long as the computing device has the capability to play it back (for example up to 2 seconds for a 2-second fragment). This enables the computing device to more efficiently upshift and downshift requests. With traditional video fragments, the computing device must send a new request, incurring the overhead of a new HTTP request and potentially new TCP connection.

With temporal interlacing, the computing device may determine to upshift or downshift during a request, and simply terminate the connection sooner or later, without requiring a new request for the new bit rate. The computing device may achieve a dynamic time-to-first-frame. On the first request the computing device may receive a same quantity of the encoded plurality of temporally interlaced blocks as the quantity of frames (e.g., a portion of the bytes of the full video), then determine a tradeoff between how high quality the computing device desired to display the first frame, versus how long to wait with a black screen until displaying the first frame.

For example, the computing device may select a low time-to-first-frame for a first fragment of the video and receive more bytes for a highest possible bit rate for its bandwidth with the next fragment. The computing device may also dynamically determine latency and bandwidth during the first request and terminate it if the computing device determines it has reached the desired ratio of quality to time. With traditional video, the computing device must predict beforehand its network performance, and if the prediction is incorrect, the time-to-first-frame will be longer than necessary, or the quality poorer than necessary.

Figure 10:
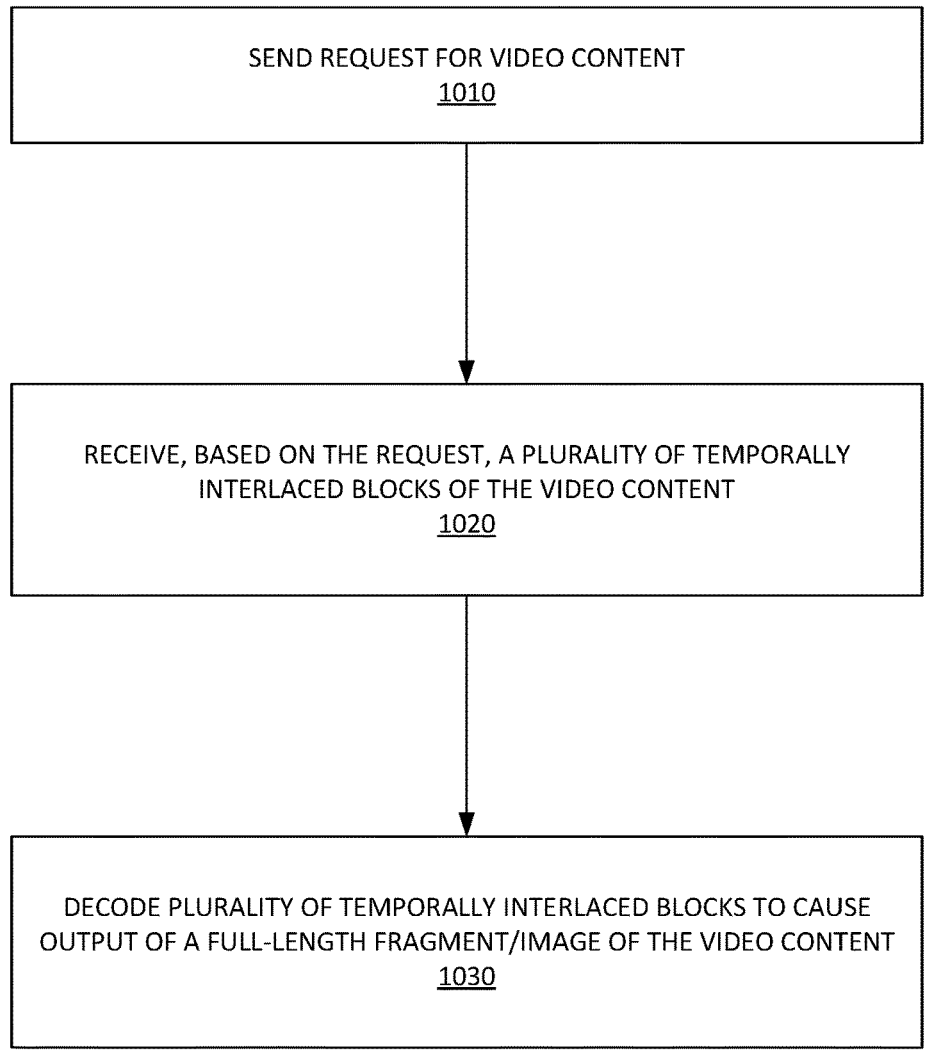
FIG. 10 shows an example method.

FIG. 10 shows an example method 1000. The method 1000 of FIG. 10, may be performed by any device, for example, by any of the devices depicted in FIGS. 1-8 or described herein. While each step in the method 1000 of FIG. 10 is shown and described separately, multiple steps may be executed in a different order than what is shown, in parallel with each other, concurrently with each other, or serially with each other. At step 1010, a request for video content may be sent. For example, a computing device may send the request to a CDN. The CDN may send the request to a content origin. The video content may comprise at least one of: one or more video fragments; one or more video segments; or streamed video content such as a program, show, or movie.

At step 1020, based on the request, a plurality of temporally interlaced blocks of the video content may be received. Each temporally interlaced block, of the temporally interlaced plurality of blocks, may comprise a portion of a frame of the requested video content. Each temporally interlaced block may comprise a portion of the bytes in a frame. The plurality of temporally interlaced blocks may comprise a sequence of each portion of each frame of video content. The plurality of temporally interlaced blocks may comprise at least a same quantity as a quantity of frames associated with the video content.

For example, the CDN or the content origin may have encoded a first block of a first frame, a first block of a second frame, and a first block of every subsequent frame in the video content. Once every first block of every frame is encoded, the CDN or content origin may have encoded a second block of the first frame, a second block of a second frame, and a second block of every subsequent frame in the video content. The CDN or content origin may have continued encoding blocks for each remaining portion of each frame.

As a result of the frames of video content having been encoded as a plurality of temporally interlaced blocks, the bit rate of the video content may be determined dynamically. For example, the CDN or the content origin encoding the video the video may select the bit rate of the video content. The CDN or the content origin may use a determination of the computing device's bandwidth and/or latency, factored with the quantity of frames (e.g., the length of the video content or video fragment length), to determine the bit rate. Alternatively, the CDN or the content origin may use a hard-coded or configurable bit rate when encoding video, which may be less than the true maximum bit rate or file size that is being encoded. To select a bit rate lower than the maximum, the CDN may terminate the connection to the computing device as though the complete file had been sent, which causes the computing device to display the blocks received prior to the termination. If the quantity of blocks is as least as much as the determined quantity of frames, a full-length fragment of the video content is able to be displayed, at least at a low quality (e.g., low quality bit rate or resolution). This allows the CDN to serve a partially successful result, which represents the complete video fragment length at a reduced quality (e.g., at a low quality bit rate or resolution), but without temporal interlacing, the CDN cannot send the complete video length.

At step 1030, the plurality of temporally interlaced blocks may be decoded by the computing device. This may cause output, by the computing device, of a full-length fragment of the video content. For example, decoding each first block of every frame causes a full-length fragment of the video content to be displayed at a reduced quality (e.g., low quality bit rate or resolution). By decoding each subsequent block of every frame, the full-length fragment of the video content is displayed at increasingly improved quality. For example, the computing device may receive each first block of every frame from a CDN, and the connection to the CDN may terminate. The computing device may decode each first block of every frame causing display of a full-length fragment of the video content to be displayed at a low quality (e.g., low quality bit rate or resolution). The CDN or the computing device may reestablish the connection so that the remaining blocks of the plurality of blocks are sent.

This technique may enable the computing device to select a bit rate for the video content. The bit rate selection may be based on the computing device's connection determination. The computing device may select the bit rate by, for example, terminating the connection after a given number of bytes are received or by sending an HTTP Range Request or other partial data request mechanism. With traditional non-temporally-interlaced video technologies which use variant manifests for variable bit rate, the computing device may select the bit rate, but this may require a new HTTP request and potentially new TCP connection. With traditional non-temporally-interlaced video technologies, the computing device also needs to know the desired bit rate before the request is initiated, and it may require the computing device to request multiple bit rates in order to quickly downshift variants.

For example, in poor network conditions, the computing device may playback a same quantity of the encoded plurality of temporally interlaced blocks as the quantity of frames to allow the computing device to watch an uninterrupted video (at a reduced quality), where an intermittent network would otherwise make a traditional video fragment result in black screens for the missing period of time. The computing device may also shift quality of video without a new request, by continuing to receive a file as long as the computing device has the capability to play it back (for example up to 2 seconds for a 2-second fragment). This enables the computing device to more efficiently upshift and downshift requests. With traditional video fragments, the computing device must send a new request, incurring the overhead of a new HTTP request and potentially new TCP connection.

With temporal interlacing, the computing device may determine to upshift or downshift during a request, and simply terminate the connection sooner or later, without requiring a new request for the new bit rate. The computing device may achieve a dynamic time-to-first-frame. On the first request the computing device may receive a same quantity of the encoded plurality of temporally interlaced blocks as the quantity of frames (e.g., a portion of the bytes of the full video), then determine a tradeoff between how high quality the computing device desired to display the first frame, versus how long to wait with a black screen until displaying the first frame.

For example, the computing device may select a low time-to-first-frame for a first fragment of the video and receive more bytes for a highest possible bit rate for its bandwidth with the next fragment. The computing device may also dynamically determine latency and bandwidth during the first request and terminate it if the computing device determines it has reached the desired ratio of quality to time. With traditional video, the computing device must predict beforehand its network performance, and if the prediction is incorrect, the time-to-first-frame will be longer than necessary, or the quality poorer than necessary.

Figure 11:
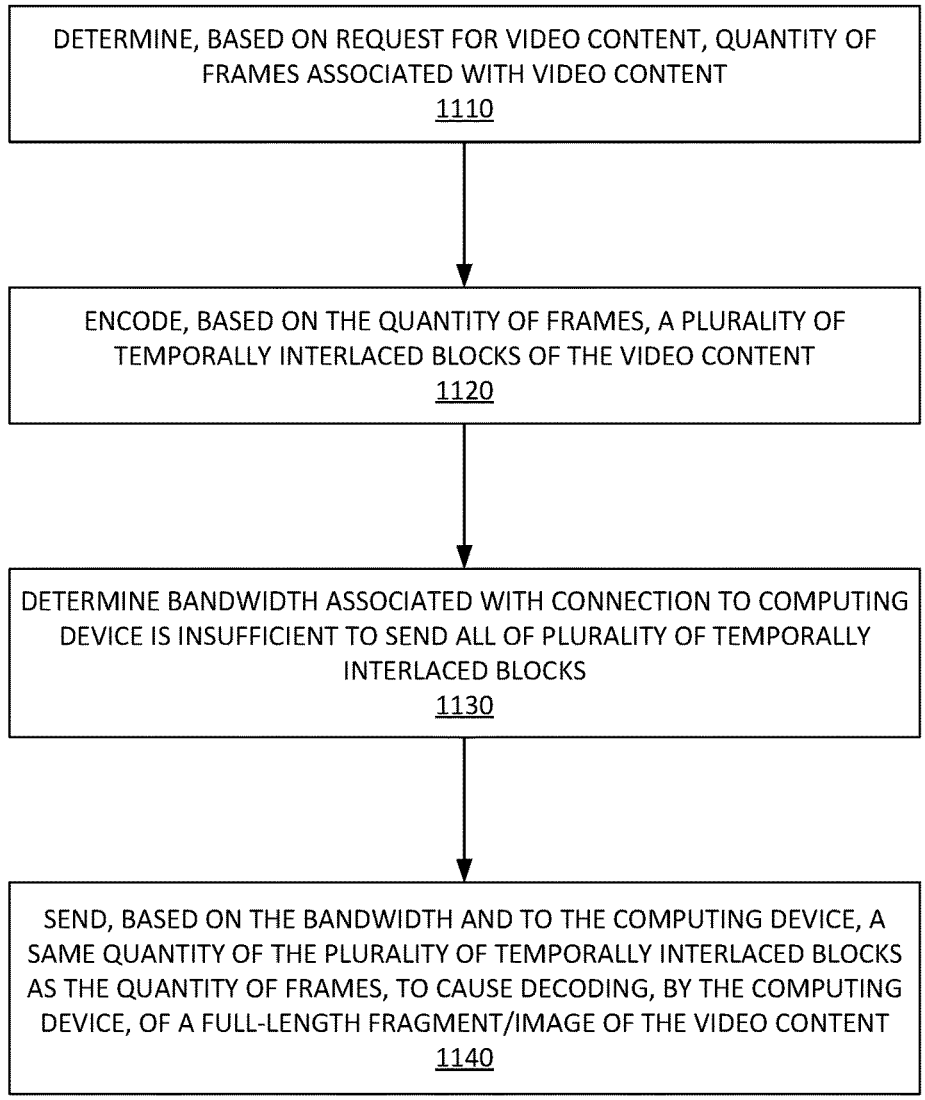
FIG. 11 shows an example method.

FIG. 11 shows an example method 1100. The method 1100 of FIG. 11, may be performed by any device, for example, by any of the devices depicted in FIGS. 1-8 or described herein. While each step in the method 1100 of FIG. 11 is shown and described separately, multiple steps may be executed in a different order than what is shown, in parallel with each other, concurrently with each other, or serially with each other. At step 1110, a quantity of frames, associated with video content, may be determined. The quantity of frames may be determined based on a request for the video content. For example, a CDN may receive a request for video content from a computing device. The CDN may send the request to a content origin. The video content may comprise at least one of: one or more video fragments; one or more video segments; or streamed video content such as a program, show, or movie. The CDN or the content origin may determine the quantity of frames associated with the video content. The quantity of frames may represent a time interval within a video or the full length of the video.

At step 1120, based on the quantity of frames, a plurality of temporally interlaced blocks of the video content may be encoded. Each temporally interlaced block, of the temporally interlaced plurality of blocks, may comprise a portion of a frame of the video content. Each temporally interlaced block may comprise a portion of the bytes in a frame. The plurality of temporally interlaced blocks may comprise a sequence of each portion of each frame of video content. For example, the CDN or the content origin may encode a first block of a first frame, a first block of a second frame, and a first block of every subsequent frame in the video content. Once every first block of every frame is encoded, the CDN or content origin may encode a second block of the first frame, a second block of a second frame, and a second block of every subsequent frame in the video content. The CDN or content origin may continue encoding blocks for each remaining portion of each frame.

At step 1130, bandwidth associated with a connection to a computing device may be determined to be insufficient to send the plurality of temporally interlaced blocks. As a result of the frames of video content having been encoded as a plurality of temporally interlaced blocks, the bit rate of the video content may be determined dynamically. For example, the CDN or the content origin encoding the video the video may select the bit rate of the video content. The CDN or the content origin may use the determination of the computing device's bandwidth and/or latency, factored with the quantity of frames (e.g., the length of the video content or video fragment length), to determine the bit rate. Alternatively, the CDN or the content origin may use a hard-coded or configurable bit rate when encoding video, which may be less than the true maximum bit rate or file size that is being encoded. To select a bit rate lower than the maximum, the CDN may terminate the connection to the computing device as though the complete file had been sent, which causes the computing device to display the blocks received prior to the termination. If the quantity of blocks is as least as much as the determined quantity of frames, a full-length fragment of the video content is able to be displayed, at least at a low quality (e.g., low quality bit rate or resolution). This allows the CDN to serve a partially successful result, which represents the complete video fragment length at a reduced quality (e.g., at a low quality bit rate or resolution), but without temporal interlacing, the CDN cannot send the complete video length.

At step 1140, a same quantity of the plurality of temporally interlaced blocks as the quantity of frames, may be sent, to the computing device and based on the bandwidth. This may cause decoding/display, by the computing device, of a full-length fragment of the video content. For example, decoding each first block of every frame causes a full-length fragment of the video content to be displayed at a reduced quality (e.g., low quality bit rate or resolution). By decoding each subsequent block of every frame, the full-length fragment of the video content is displayed at increasingly improved quality. For example, a computing device may receive each first block of every frame from a CDN, and the connection to the CDN may terminate. The computing device may decode each first block of every frame causing display of a full-length fragment of the video content to be displayed at a low quality (e.g., low quality bit rate or resolution). The CDN or the computing device may reestablish the connection so that the remaining blocks of the plurality of blocks are sent.

This technique may also enable the computing device to select a bit rate for the video content. The bit rate selection may be based on the computing device's connection determination. The computing device may select the bit rate by, for example, terminating the connection after a given number of bytes are received or by sending an HTTP Range Request or other partial data request mechanism. With traditional non-temporally-interlaced video technologies which use variant manifests for variable bit rate, the computing device may select the bit rate, but this may require a new HTTP and potentially new TCP connection. With traditional non-temporally-interlaced video technologies, the computing device also needs to know the desired bit rate before the request is initiated, and it may require the computing device to request multiple bit rates in order to quickly downshift variants.

For example, in poor network conditions, the computing device may playback a same quantity of the encoded plurality of temporally interlaced blocks as the quantity of frames to allow the computing device to watch an uninterrupted video (at a reduced quality), where an intermittent network would otherwise make a traditional video fragment result in black screens for the missing period of time. The computing device may also shift quality of video without a new request, by continuing to receive a file as long as the computing device has the capability to play it back (for example up to 2 seconds for a 2-second fragment). This enables the computing device to more efficiently upshift and downshift requests. With traditional video fragments, the computing device must send a new request, incurring the overhead of a new HTTP request and potentially new TCP connection.

With temporal interlacing, the computing device may determine to upshift or downshift during a request, and simply terminate the connection sooner or later, without requiring a new request for the new bit rate. The computing device may achieve a dynamic time-to-first-frame. On the first request the computing device may receive a same quantity of the encoded plurality of temporally interlaced blocks as the quantity of frames (e.g., a portion of the bytes of the full video), then determine a tradeoff between how high quality the computing device desired to display the first frame, versus how long to wait with a black screen until displaying the first frame.

For example, the computing device may select a low time-to-first-frame for a first fragment of the video and receive more bytes for a highest possible bit rate for its bandwidth with the next fragment. The computing device may also dynamically determine latency and bandwidth during the first request and terminate it if the computing device determines it has reached the desired ratio of quality to time. With traditional video, the computing device must predict beforehand its network performance, and if the prediction is incorrect, the time-to-first-frame will be longer than necessary, or the quality poorer than necessary.

Figure 12:
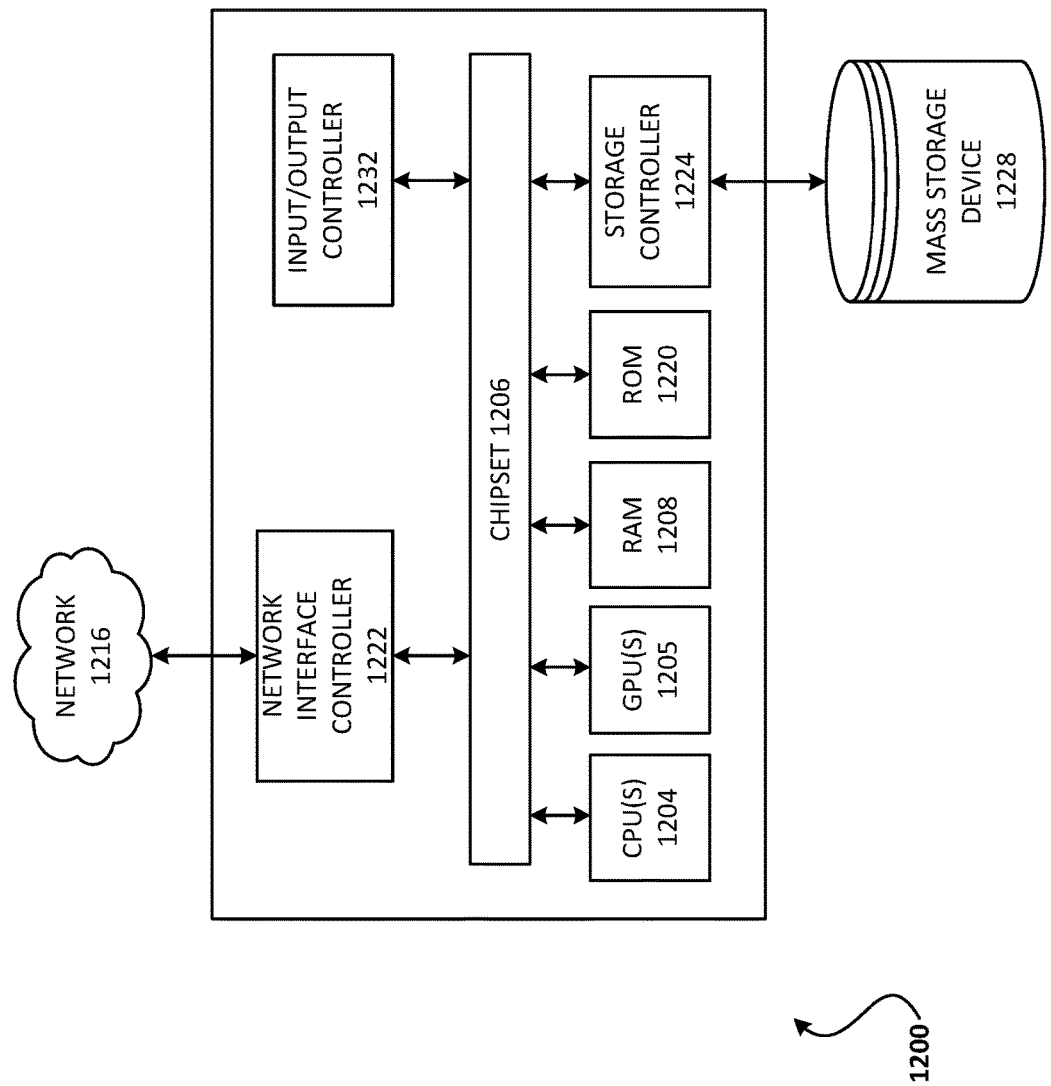
FIG. 12 depicts an example computing device.

FIG. 12 depicts a computing device 1200 that may be used in various aspects, such as the servers, modules, and/or devices depicted in any of the depicted in FIGS. 1-8. With regard to the example devices described herein, the devices may each be implemented in an instance of a computing device 1200 of FIG. 12. The computer architecture shown in FIG. 12 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 4-11.

The computing device 1200 may include a baseboard, or "motherboard," which is a printed circuit board to which a multitude of components or devices may be connected by way of a system bus or other electrical communication paths. One or more central processing units (CPUs) 1204 may operate in conjunction with a chipset 1206. The CPU(s) 1204 may be standard programmable processors that perform arithmetic and logical operations necessary for the operation of the computing device 1200.

The CPU(s) 1204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1204 may be augmented with or replaced by other processing units, such as GPU(s) 1205. The GPU(s) 1205 may comprise processing units specialized for but not necessarily limited to highly parallel computations, such as graphics and other visualization-related processing.

A chipset 1206 may provide an interface between the CPU(s) 1204 and the remainder of the components and devices on the baseboard. The chipset 1206 may provide an interface to a random access memory (RAM) 1208 used as the main memory in the computing device 1200. The chipset 1206 may further provide an interface to a computer-readable storage medium, such as a read-only memory (ROM) 1220 or non-volatile RAM (NVRAM) (not shown), for storing basic routines that may help to start up the computing device 1200 and to transfer information between the various components and devices. ROM 1220 or NVRAM may also store other software components necessary for the operation of the computing device 1200 in accordance with the aspects described herein.

The computing device 1200 may operate in a networked environment using logical connections to remote computing nodes and computer systems through local area network (LAN) 1216. The chipset 1206 may include functionality for providing network connectivity through a network interface controller (NIC) 1222, such as a gigabit Ethernet adapter. A NIC 1222 may be capable of connecting the computing device 1200 to other computing nodes over a network 1216. It should be appreciated that multiple NICs 1222 may be present in the computing device 1200, connecting the computing device to other types of networks and remote computer systems.

The computing device 1200 may be connected to a mass storage device 1228 that provides non-volatile storage for the computer. The mass storage device 1228 may store system programs, application programs, other program modules, and data, which have been described in greater detail herein. The mass storage device 1228 may be connected to the computing device 1200 through a storage controller 1224 connected to the chipset 1206. The mass storage device 1228 may consist of one or more physical storage units. A storage controller 1224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1200 may store data on a mass storage device 1228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1228 is characterized as primary or secondary storage and the like.

For example, the computing device 1200 may store information to the mass storage device 1228 by issuing instructions through a storage controller 1224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1200 may further read information from the mass storage device 1228 by detecting the physical states or characteristics of one or more particular locations within the physical storage units.

In addition to the mass storage device 1228 described herein, the computing device 1200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1200.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1228 depicted in FIG. 12, may store an operating system utilized to control the operation of the computing device 1200. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1228 may store other system or application programs and data utilized by the computing device 1200.

The mass storage device 1228 or other computer-readable storage media may also be encoded with computer-executable instructions, which, when loaded into the computing device 1200, transforms the computing device from a general-purpose computing system into a special-purpose computer capable of implementing the aspects described herein. These computer-executable instructions transform the computing device 1200 by specifying how the CPU(s) 1204 transition between states, as described herein. The computing device 1200 may have access to computer-readable storage media storing computer-executable instructions, which, when executed by the computing device 1200, may perform the methods described in relation to FIGS. 4-11.

A computing device, such as the computing device 1200 depicted in FIG. 12, may also include an input/output controller 1232 for receiving and processing input from a number of input devices, such as a keyboard, a mouse, a touchpad, a touch screen, an electronic stylus, or other type of input device. Similarly, an input/output controller 1232 may provide output to a display, such as a computer monitor, a flat-panel display, a digital projector, a printer, a plotter, or other type of output device. It will be appreciated that the computing device 1200 may not include all of the components shown in FIG. 12, may include other components that are not explicitly shown in FIG. 12, or may utilize an architecture completely different than that shown in FIG. 12.

As described herein, a computing device may be a physical computing device, such as the computing device 1200 of FIG. 12. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   receiving, from a computing device, a request for video content;
   determining a quantity of a plurality of frames of the video content;
   encoding a plurality of blocks of the video content, wherein each block, of the plurality of blocks, comprises a portion of each frame of the plurality of frames, and wherein the plurality of blocks are interlaced in a same order as the plurality of frames; and
   sending, to the computing device, at least a same quantity of the plurality of blocks as the quantity of the plurality of frames to cause decoding, by the computing device, of a full-length fragment of the video content.

2. The method of claim 1, wherein the requested video content comprises at least one of: a segment of video content, the full-length fragment of video content, or a streamed video.

3. The method of claim 1, wherein quality of the full-length fragment improves as a quantity of blocks of the plurality of blocks that are decoded, by the computing device, increases.

4. The method of claim 1, wherein the plurality of blocks comprises at least one of:
   metadata indicating the quantity of the plurality of frames to indicate to the computing device a length of the full-length fragment of the video content, or
   a sequence of each portion of each frame of the video content.

5. The method of claim 1, wherein the encoding is performed by at least one of: a content origin device, a computing device of a content delivery network (CDN), or an intermediary proxy service device.

6. The method of claim 1, further comprising:
   determining that bandwidth associated with a connection to the computing device is insufficient to send the plurality of blocks.

7. The method of claim 6, wherein the determining, that bandwidth associated with the connection to the computing device is insufficient to send the plurality of blocks, is based on at least one of:
   a message, from a second computing device, indicating network conditions, or
   a policy associated with bandwidth resources.

8. The method of claim 1, wherein the sending is based on a termination of a connection to the computing device, to cause the sending.

9. The method of claim 8, wherein the termination is caused by at least one of:
  interference from a second computing device, or
  a disruption in the connection.

10. The method of claim 1, wherein the at least the same quantity of the plurality of blocks is sufficient for the full-length fragment of the video content to be displayed at a reduced quality.

11. A method comprising:
  sending a request for video content;
  receiving, based on the request, a plurality of blocks of the video content, wherein each block, of the plurality of blocks, comprises a portion of each frame of a plurality of frames of the video content, and wherein the plurality of blocks are interlaced in a same order as the plurality of frames; and
  decoding at least a same quantity of the plurality of blocks as a quantity of the plurality of frames to cause output of a full-length fragment of the video content.

12. The method of claim 11, wherein quality of the full-length fragment improves as a quantity of blocks of the plurality of blocks that are decoded, by the computing device, increases.

13. The method of claim 11, wherein the plurality of blocks comprises at least one of:
  metadata indicating the quantity of the plurality of frames to indicate a length of the full-length fragment of the video content, or
  a sequence of each portion of each frame of the video content.

14. The method of claim 11, wherein the plurality of blocks was encoded by at least one of: a content origin device, a computing device of a content delivery network (CDN), or an intermediary proxy service device.

15. The method of claim 11, further comprising:
  determining that bandwidth associated with a connection to a content delivery network (CDN) is insufficient to receive the requested video content.

16. The method of claim 15, further comprising:
  sending a message indicating the connection to the CDN is insufficient to receive the requested video content; and
  determining that the connection has been terminated.

17. The method of claim 11, wherein the at least the same quantity of the plurality of blocks is sufficient for the full-length fragment of the video content to be displayed at a reduced quality.

18. A method comprising:
  determining, based on a request for video content, a quantity of a plurality of frames of the video content;
  encoding a plurality of blocks of the video content, wherein each block, of the plurality of blocks, comprises a portion of each frame of the plurality of frames, and wherein the plurality of blocks are interlaced in a same order as the plurality of frames;
  determining that bandwidth associated with a connection to a computing device is insufficient to send the plurality of blocks; and
  sending, based on the bandwidth and to the computing device, a same quantity of a portion of the plurality of blocks as the quantity of the plurality of frames to cause decoding, by the computing device, of a full-length fragment of the video content at a reduced bit rate.

19. The method of claim 18, wherein quality of the full-length fragment improves as a quantity of blocks of the plurality of blocks that are decoded, by the computing device, increases.

20. The method of claim 18, wherein the plurality of blocks comprises at least one of:
  metadata indicating the quantity of the plurality of frames to indicate to the computing device a length of the full-length fragment of the video content, or
  a sequence of each portion of each frame of the video content.

* * * * *